United States Patent
Itoh et al.

(10) Patent No.: US 7,583,193 B2
(45) Date of Patent: Sep. 1, 2009

(54) METHOD FOR SUPPORTING AN ANTENNA WIRING, AND A SYSTEM

(75) Inventors: Akihiro Itoh, Yokohama (JP); Yoshiyuki Tamukai, Yokohama (JP); Hideki Sano, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 132 days.

(21) Appl. No.: 11/873,025

(22) Filed: Oct. 16, 2007

(65) Prior Publication Data

US 2008/0129643 A1 Jun. 5, 2008

(30) Foreign Application Priority Data

Oct. 18, 2006 (JP) ............................. 2006-283507

(51) Int. Cl.
*G08B 13/14* (2006.01)
*H01Q 21/00* (2006.01)

(52) U.S. Cl. ..................................... 340/572.1; 343/893

(58) Field of Classification Search .............. 340/572.1, 340/572.2, 572.4; 343/893

See application file for complete search history.

(56) References Cited

U.S. PATENT DOCUMENTS

| | | | |
|---|---|---|---|
| 6,392,544 B1 * | 5/2002 | Collins et al. ............ | 340/572.7 |
| 6,903,656 B1 * | 6/2005 | Lee .......................... | 340/572.1 |
| 7,161,489 B2 * | 1/2007 | Sullivan et al. .......... | 340/572.4 |
| 2007/0139162 A1 * | 6/2007 | Bandy et al. ............... | 340/10.2 |
| 2007/0188328 A1 | 8/2007 | Mochizuki et al. | |

FOREIGN PATENT DOCUMENTS

| | | |
|---|---|---|
| JP | 5-028088 | 2/1993 |
| JP | 2005-157645 | 6/2005 |
| JP | 2007-221304 | 8/2007 |

* cited by examiner

*Primary Examiner*—Shih-Chao Chen
(74) *Attorney, Agent, or Firm*—Brundidge & Stanger, P.C.

(57) ABSTRACT

It is desirable to make the antenna wiring more efficient in the building of an RFID system. The system includes antennas and readers connected in an arbitrary manner, in which calibration tags are installed on all the antennas. By reading the calibration tags, the system automatically generates the correspondences between the access paths and antenna logical names of the antennas, to serve as antenna configuration information. While the user generates combinations of the antenna logical names of the one or more antennas to be simultaneously driven, to serve as derive sequence information. The system compares the automatically generated antenna configuration information with the user-generated driving sequence information, and if there is an inconsistency in the setting of the both, generates an antenna rewiring procedure so as to resolve the inconsistency. The antenna rewiring procedure is generated as a combination of the substitution operation of the antenna wiring.

8 Claims, 7 Drawing Sheets

DRIVE SEQUENCE INFORMATION TABLE (10)

| SEQUENCE NO. | ANTENNA LOGICAL NAME |
|---|---|
| #1 | a1, a5, a7 |
| #2 | a2, a3, a8 |
| #3 | a4, a6, a9 |

ANTENNA CONFIGURATION INFORMATION TABLE (11-1)

| R/W NO. | ANTENNA PORT | ANTENNA LOGICAL NAME |
|---|---|---|
| 1 | 1 | a1 |
| 1 | 2 | a2 |
| 1 | 3 | a5 |
| 2 | 1 | a4 |
| 2 | 2 | a6 |
| 2 | 3 | a7 |
| 3 | 1 | a3 |
| 3 | 2 | a8 |
| 3 | 3 | a9 |

FIG.7

MISWRITING INFORMATION TABLE (12-1)

| MISWIRED ANTENNA LOGICAL NAME | MISWIRED R/W NO. | FORBIDDEN R/W NO. |
|---|---|---|
| a1, a5 | 1 | 2 |
| a3, a8 | 3 | 1 |
| a4, a6 | 2 | 3 |

FIG.8

ANTENNA CONFIGURATION INFORMATION TABLE (11-2)

| R/W NO. | ANTENNA PORT | ANTENNA LOGICAL NAME |
|---|---|---|
| 1 | 1 | a3 |
| 1 | 2 | a2 |
| 1 | 3 | a5 |
| 2 | 1 | a4 |
| 2 | 2 | a6 |
| 2 | 3 | a7 |
| 3 | 1 | a1 |
| 3 | 2 | a8 |
| 3 | 3 | a9 |

FIG.9

ERROR LINE INFORMATION TABLE (12-2)

| MISWIRED ANTENNA LOGICAL NAME | MISWIRED R/W NO. | FORBIDDEN R/W NO. |
|---|---|---|
| a2, a3 | 1 | 3 |
| a4, a6 | 2 | 3 |

FIG. 10

ANTENNA CONFIGURATION INFORMATION TABLE (11-3)

| R/W NO. | ANTENNA PORT | ANTENNA LOGICAL NAME |
|---------|--------------|----------------------|
| 1 | 1 | a3 |
| 1 | 2 | a4 |
| 1 | 3 | a5 |
| 2 | 1 | a2 |
| 2 | 2 | a6 |
| 2 | 3 | a7 |
| 3 | 1 | a1 |
| 3 | 2 | a8 |
| 3 | 3 | a9 |

FIG. 11

REWIRING INSTRUCTION

| OPERATION (ANTENNA SIDE) | OPERATION (READER SIDE), (R/W, ANTENNA PORT) | |
|--------------------------|----------------------------------------------|------|
| a1 ⟷ a3 | (1, 1) ⟷ (3, 1) | DONE |
| a4 ⟷ a6 | (2, 1) ⟷ (2, 2) | |

CANCEL      GO TO NEXT

METHOD FOR SUPPORTING AN ANTENNA WIRING, AND A SYSTEM

CLAIM OF PRIORITY

The present application claims priority from Japanese application JP No. 2006-283507 filed on Oct. 18, 2006, the content of which is hereby incorporated by reference into this application.

BACKGROUND OF THE INVENTION

1. Field of the Invention

The present invention relates to a technology for supporting an antenna wiring in an RFID system.

2. Description of the Related Art

There is known a technology, such as disclosed in JP-A No. 28088/1993, which automatically generates configuration information of devices to be connected to a system. This document discloses the generation of a configuration information table that is appropriate for all possible connections between input/output devices, because a central control unit attempts to read the configuration information through all access paths to the input/output devices.

There is also an RFID system technology (Japanese Patent Application Laid-Open Publication No. 2005-157645) which wirelessly communicates with RFID (Radio Frequency Identification) tags to read data from the RFID tags attached to goods, and confirms the presence of the goods.

A smart shelf is an application example of the RFID system. This system includes many antennas arranged on shelves to manage the goods placed on shelves by reading RFID tags attached to the goods on the shelves from the antennas.

In general, the RFID system controls so that one antenna emits electric waves at one moment. However, the RFID system including many antennas, such as the smart shelf, needs a longer time to drive all the antennas in series. Thus, it is designed to reduce the scan time by simultaneously driving plural antennas in which no electric wave interference occurs during the simultaneous drive, by plural readers.

For this reason, in order to build a smart shelf system, it is necessary to (1) determine the driving sequence of antennas on shelves based on a system design, (2) provide wiring between the antennas and readers so that the antennas to be simultaneously driven are connected to different readers, and (3) set a control terminal to drive the readers so that the antennas are driven according to the first determined driving sequence.

SUMMARY OF THE INVENTION

Heretofore, the RFID system using many antennas and readers has been built by connecting wires between the antennas and the readers based on the configuration information for managing the wiring therebetween, and by setting on the control terminal. However, when the numbers of antennas and readers increase, the wiring based on the configuration information becomes very complicated, and even the smallest wiring error may cause malfunction of the system. In order to approach this problem, there would be a method for automatically generating the configuration information after arbitrarily connecting the wires as described in Japanese Patent Application Laid-Open Publication No. 2005-157645. Meanwhile, the configuration information may not be recorded in the antennas although it is recorded in the input/output devices.

Further, even if such configuration information is automatically generated, the following problem arises. That is, when plural antennas are simultaneously driven, it is necessary to connect the antennas to different readers as the number of antennas that one reader can simultaneously drive is limited to one. However, when the antennas and the readers are arbitrarily connected, there is a possibility that the antennas to be simultaneously driven are connected to the same reader.

Thus, it is desirable to provide a method for supporting an antenna wiring, which improves efficiency of the antenna wiring in the building of a system using an RFID device and can prevent a wiring error, and provide a system for the same.

The present invention provides a method for supporting an antenna wiring of an RFID system including plural antennas, plural readers for driving the antennas, and a control terminal for controlling the readers. When the RFID system is normally operated the control terminal controls the antennas based on driving sequence information indicating combinations of antenna logical names of one or more antennas to be simultaneously driven, and on antenna configuration information indicating correspondences between the antenna logical names and access paths. When the RFID system is built, calibration tags on which the antenna logical names are written are installed on the antennas. The control terminal drives the plural readers, generates the antenna configuration information by reading the calibration tags from the plural antennas, compares the generated antenna configuration information with the driving sequence information, and performs a rewiring instruction of the antenna if there is an inconsistency in the setting.

The present invention provides a system for supporting an antenna wiring of an RFID system including plural antennas, plural readers for driving the antennas, and a control terminal for controlling the readers. The control terminal includes, when the RFID system is operated, a reader controller for controlling the antennas based on driving sequence information indicating combinations of antenna logical names of one or more antennas to be simultaneously driven and on antenna configuration information indicating correspondences between the antenna logical names and access paths; when the RFID system is built, a configuration information generating unit for generating the antenna configuration information by driving the plural readers, and by reading calibration tags on which the antenna logical names are written from the plural antennas and which are installed on the antennas; and a configuration information confirming unit for comparing the antenna configuration information generated by the configuration information generating unit with the drive sequence information, and performing a rewiring instruction of the antenna if there is an inconsistency in the setting.

More specifically, the control terminal for controlling the readers manages the driving sequence information in which the combinations of antenna logical names of one or more antennas to be simultaneously driven are described, as well as the antenna configuration information in which the correspondences between the antenna logical names and access paths of the respective antennas are described. In normal operation, the control terminal controls the respective antennas based on the driving sequence information and the antenna configuration information.

In the building of the system, the calibration tags on which the antenna logical names are written are installed on the respective antennas. The antenna configuration information is automatically generated by driving all the readers to read the calibration tags from all the antennas. Then, the driving sequence information and the antenna configuration information are compared with each other, and the antenna rewiring instruction is displayed if there is an inconsistency in the setting.

Preferably, the existence of the inconsistency is confirmed when the antenna logical names of two or more antennas described in the driving sequence information so as to be simultaneously driven, are associated with the same R/W number in the antenna configuration information.

Preferably, the antenna rewiring instruction is performed by generating a substitution operation of the antenna logical names so that the inconsistency is resolved by substituting the antenna logical names described in the antenna configuration information, and displaying the generated substitution operation as the rewiring instruction of the wires connected to the antennas.

Further, another antenna rewiring instruction is performed by generating a substitution operation of the access paths so that the inconsistency is resolved by substituting the access paths of the antennas described in the antenna configuration information, and displaying the generated substitution operation as the rewiring instruction of the wires connected to the readers.

In the building of the system using the RFID device using many antennas and readers, such as the smart shelf, the efficiency of the antenna wiring is improved and the wiring error is prevented.

DETAILED DESCRIPTION OF THE PREFERRED EMBODIMENT

Hereinafter, a specific embodiment of a system for supporting an RFID antenna wiring according to the present invention will be described with reference to the accompanying drawings.

Figure 1:
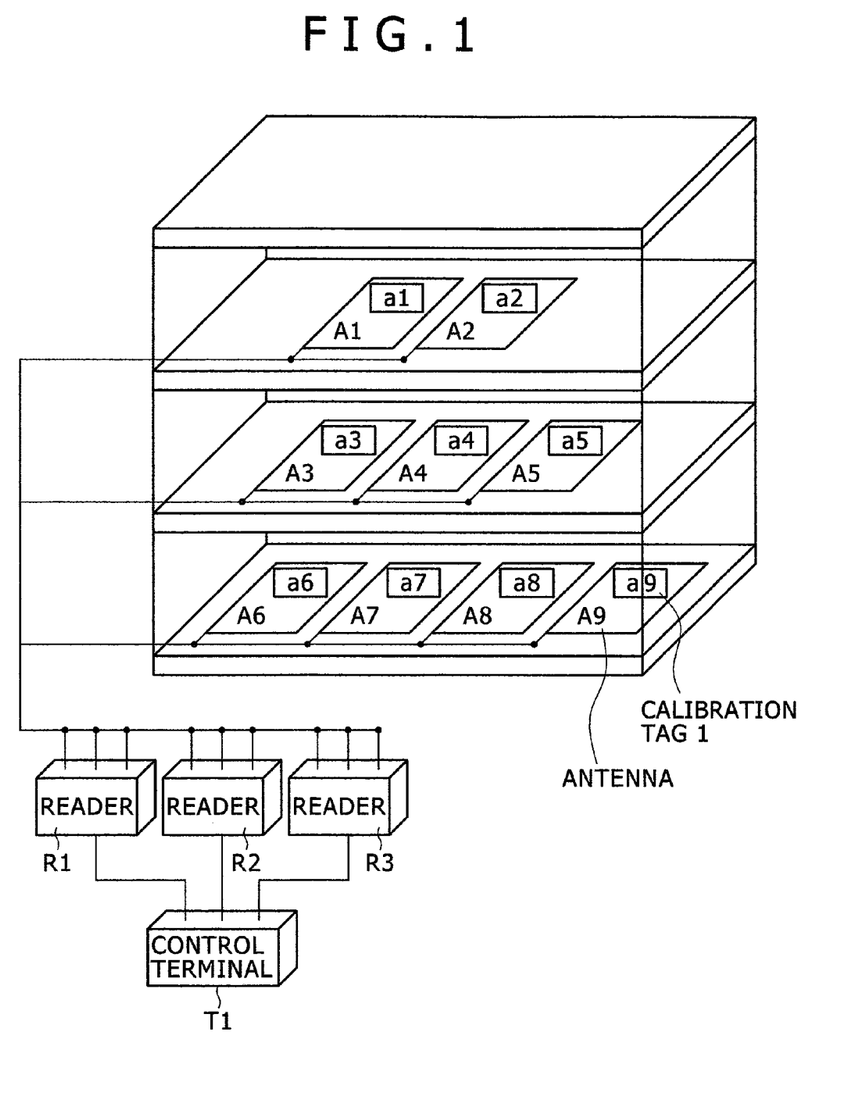
FIG. 1 is a general block diagram of a smart shelf system in a first embodiment of the present invention.

First, a description will be given of the system for supporting the RFID antenna wiring (hereinafter referred to as the system) which is a first embodiment. As shown in FIG. 1, the system for supporting the RFID antenna wiring supports the antenna wiring operation of a smart shelf which is a store shelf having an intelligent function. More specifically, when the antenna wiring provided by the user is wrong, the system presents to the user a rewiring instruction as a substitution operation of the antenna wires.

The smart shelf is provided with antennas A1 to A9. The antennas are driven by readers R1 to R3. For illustrative convenience, the readers and the antennas are connected by only a single antenna wire in FIG. 1. However, in practice, each reader has three antenna ports, and each of the antenna ports is connected to each of the antennas A1 to A9, on a one-to-one basis, by nine antenna wires in total. Reference numeral 1 denotes a calibration tag. The readers R1 to R3 are connected to a control terminal T1 by a cable of RS-232C (Recommended Standard 232 version C). The smart shelf is driven by the control terminal T1. Incidentally, reference numerals a1 to a9 in the figure denote antenna logical names which will be described below.

Figure 2:
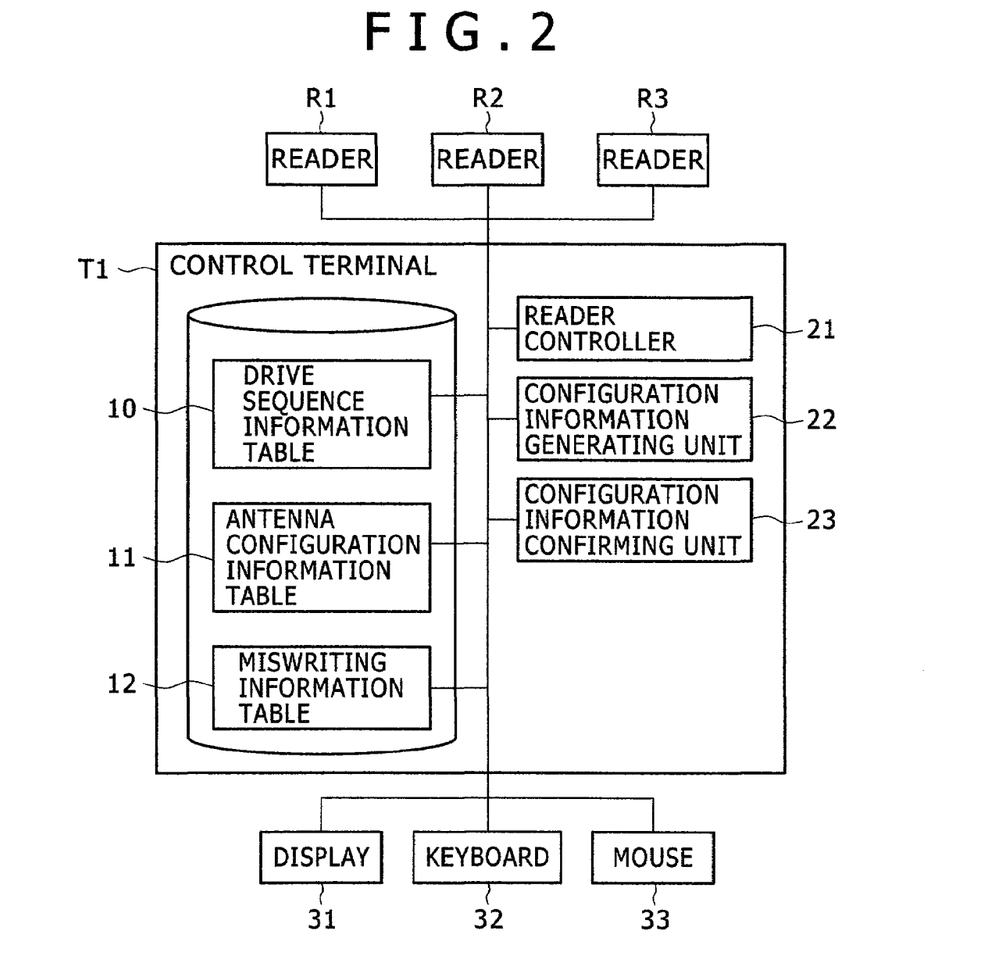
FIG. 2 is a block diagram of a control terminal in the first embodiment.

Next, an example of the control terminal T1 of the system is shown in FIG. 2. As external input/output devices, a display 31, a keyboard 32, and a mouse 33 are connected to the control terminal T1. The user uses the external input/output devices to operate the control terminal T1. A reader controller 21 transmits a drive instruction to the readers R1 to R3, and receives data read by the antennas from the readers R1 to R3. A configuration information generating unit 22 generates correspondences between the antenna logical names and access paths (reader/writer (R/W) numbers, antenna port numbers) of the antennas by assuming that the data read from the calibration tags 1 is the antenna logical names a1 to a9.

The correspondences are registered in an antenna configuration information table 11. The antenna configuration information table 11, as shown in an example of FIG. 6, contains an R/W number 111, an antenna port 112, and an antenna logical name 113. The R/W number 111 and the antenna port 112 correspond to the access path.

It is needless to say that the control terminal T1 can be configured by a general computer. The reader controller 21, the configuration information generating unit 22, and a configuration information confirming unit 23 are configured by executing a program stored in a storage unit (including a memory and a storage device) by a central processing unit (CPU) within the computer. Of course, these functional blocks may be configured in hardware. A driving sequence information table 10, an antenna configuration information table 11, and a miswiring information table 12 are stored in the storage unit.

Figure 3:
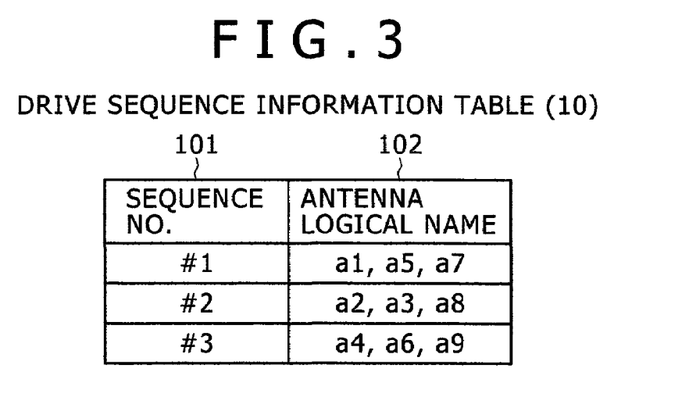
FIG. 3 is a diagram showing an example of a driving sequence information table in the first embodiment.

As shown in FIG. 3, the driving sequence information table 10 is a table containing the sequence number 101 and the antenna logical name 102, in which combinations of antennas to be simultaneously driven are described in the entries of the antenna logical name 102. For example, a combination of (a1, a5, a7) is described in the first entry in FIG. 3, so that the antennas having such antenna logical names are simultaneously driven in the first driving sequence, and then the antennas having the antenna logical names (a2, a3, a8) are simultaneously driven in the next driving sequence.

The configuration information confirming unit 23 compares the driving sequence information table 10 with the antenna configuration information table 11, and confirms whether there is an inconsistency in the setting. Here, when plural antenna logical names described in the same entry of the driving sequence information table 10 are associated with the same R/W number 111 in the antenna configuration information table 11, it should be assumed that there is an inconsistency in the setting. For example, the antenna logical names (a1, a5, a7) are registered for the first sequence in the driving sequence information table 10 in FIG. 3, but the antenna logical names a1 and a5 are both associated with the reader of R/W number "1" in the antenna configuration information table 11-1 in FIG. 6. This means that there is an inconsistency between the two tables.

If such an inconsistency exists, the configuration information confirming unit 23 generates a substitution operation so as to resolve the inconsistency by substituting the antenna logical name 113 registered in each entry of the antenna configuration information table 11, and generates a rewiring instruction of the wires connected to the antennas from the generated substitution operation. The miswiring information table 12 is used for generating the substitution operation, which will be described in detail below.

Figure 4:
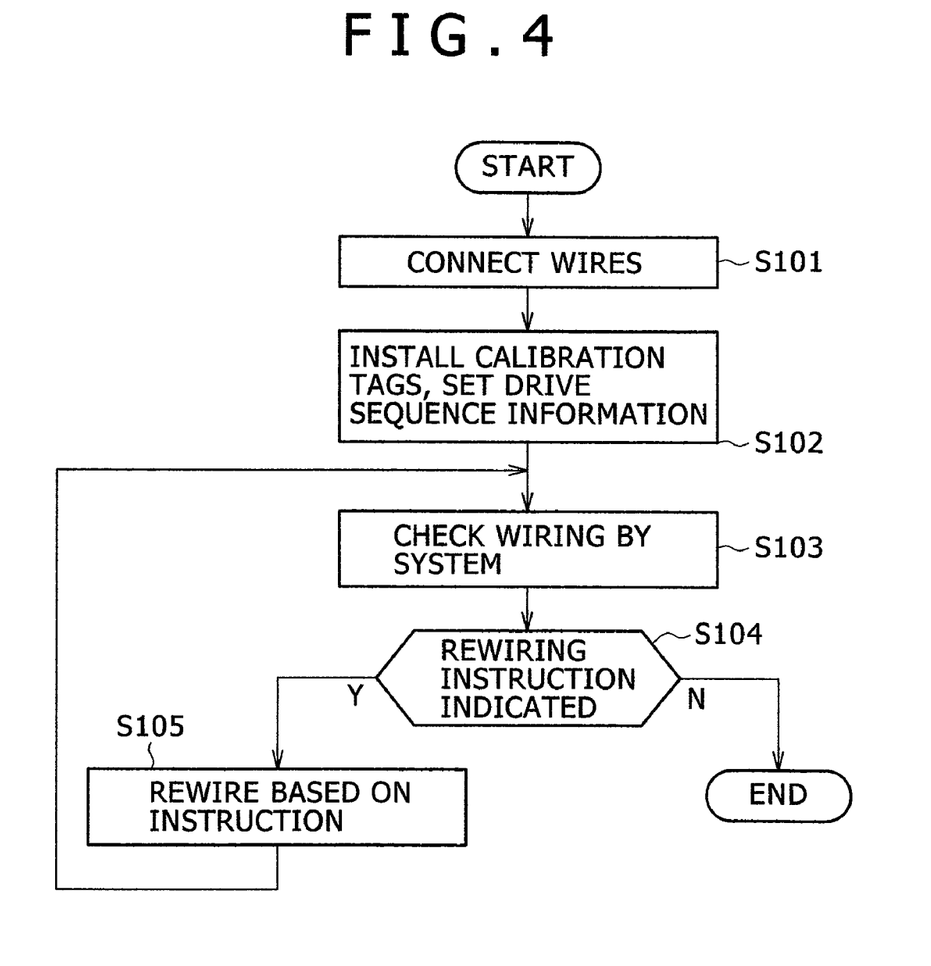
FIG. 4 is a diagram showing a flow of how to use a system for supporting an RFID antenna wiring in the first embodiment.

Next, a description will be given of how to use the system for supporting the RFID antenna wiring, which is the first embodiment, with reference to the flow shown in FIG. 4. First, the user connects wires between the antennas and the readers in an arbitrary manner. Here, as the wiring is done arbitrarily, it is very possible that the wires may be miswired (S101).

Then, the user installs the calibration tags 1 onto the antennas A1 to A9. The antenna logical names a1 to a9, which are written on the tag bodies, are printed on the calibration tags 1 so that the antennal logical names a1 to a9 can be confirmed from the appearance of the calibration tags 1. In other words, the user installs the calibration tags 1 onto the antennas to set the antenna logical names a1 to a9 onto the antennas. For example, when the user installs the calibration tags 1 as shown in FIG. 1, the logical names a1 to a9 are set to the antennas A1 to A9, respectively.

After determining the antenna logical names of the antennas, the user registers a driving sequence of the antennas into the driving sequence information table 10. Here, the antenna logical names of the antennas to be simultaneously driven are described in the same entry of the driving sequence information table 10. For example, the content is set as shown in FIG. 3. In this example, the content is set not to simultaneously drive the adjacent antennas in order to avoid electric wave interference (S102).

Next, the user performs a wiring check by using the system. Although this step is the essential part of the system, only a brief description is given here and more details will be found later. The configuration information generating unit 22 generates correspondences between the antenna logical names a1 to a9 and access paths (R/W numbers, antenna port numbers) of the antennas from the calibration tags 1 installed in S102. The generated correspondences are stored in the antenna configuration information table 11. Then, the configuration information confirming unit 23 compares the driving sequence information table 10 the user registered in S102 with the antenna configuration information table 11, and confirms whether there is an inconsistency in the setting. If an inconsistency exists, the configuration information confirming unit 23 generates and displays a rewiring instruction (S103).

When the rewiring instruction is displayed in S103, the user performs rewiring according to the rewiring instruction. After completion of the rewiring, the user returns to S103 and performs a wiring check by using the system. Here, by taking into account the possibility of a mistake in the rewiring, the user checks it again by the system (S105). The user repeats the above operation until the rewiring instruction is not displayed.

Figure 5:
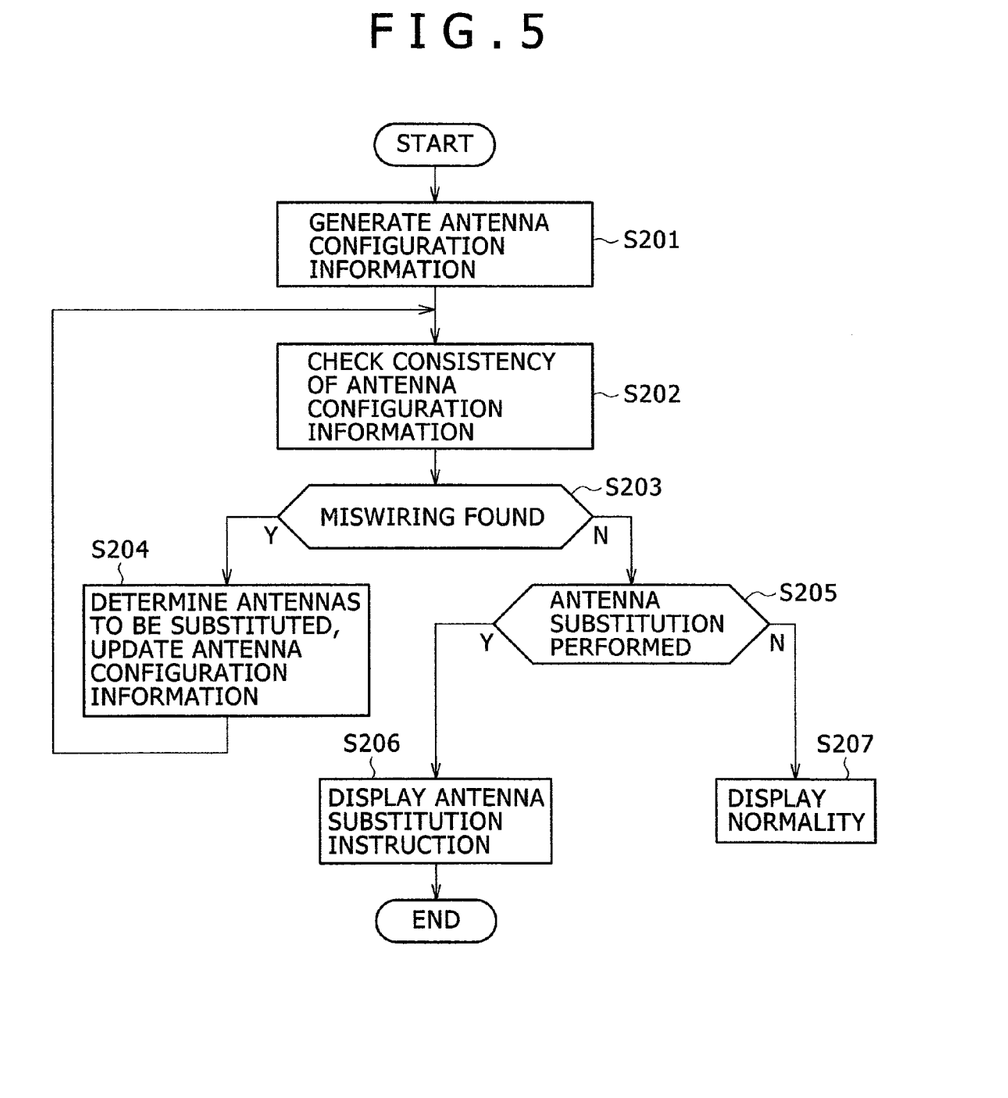
FIG. 5 is a diagram showing a flow of an internal operation of the system for supporting the RFID antenna wiring in the first embodiment.

Next, the operation of the system in step S103 will be described with reference to the flow shown in FIG. 5.

Figure 6:
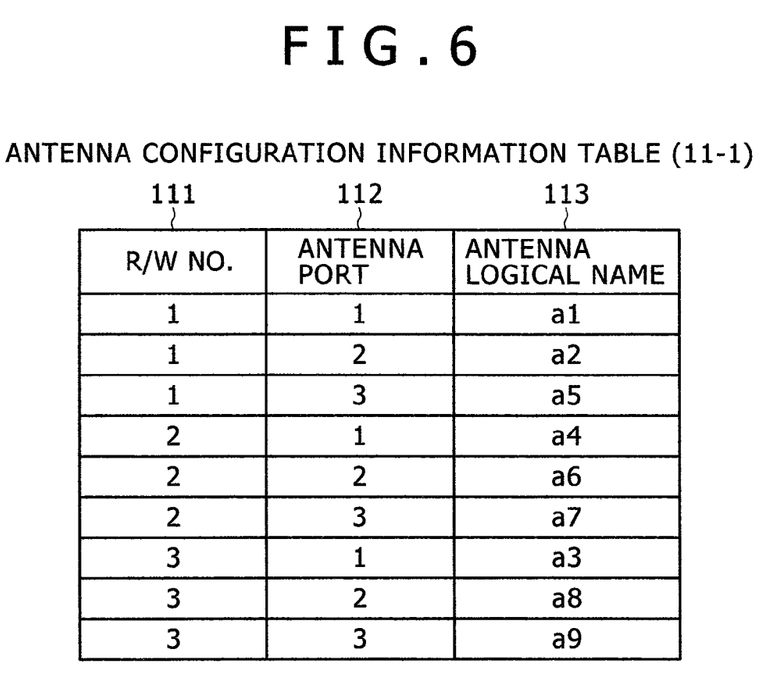
FIG. 6 is a diagram showing an example of an antenna configuration information table in the first embodiment.

The reader controller 21 sequentially drives all the antennas connected to the system, and obtains data of the calibration tags 1 from all the antennas. The configuration information generating unit 22 registers, in the antenna configuration information table 11, the correspondences between the antenna logical names a1 to a9 and access paths (R/W numbers, antenna port numbers) of the antennas, by assuming that the data of the calibration tags 1 obtained by the reader controller 21 is the antenna logical names. For example, in the case in which the reader controller 21 accesses the access path of (R/W number, antenna port number)=(1, 2) and obtains data "a2", as shown in FIG. 6, the configuration information generating unit 22 registers 1 for the R/W number, 2 for the antenna port, and "a2" for the antenna logical name in the antenna configuration information table 11. All the correspondences are registered to complete the table as shown in FIG. 6.

In this process, the reader controller 21 drives all the antennas. In order to drive all the antennas, it is necessary to know all the access paths of the antennas in advance. This can be achieved by registering the access path range (the range of the R/W numbers and of the antenna port numbers) into the reader controller 21 in advance. In other words, the reader controller 21 generates all possible access paths from the access path range registered in advance, and attempts to drive the antennas through the generated access paths. If no antenna is connected to the access path through which the drive is attempted, then no calibration tag 1 can be read. Thus, the configuration information generating unit 22 registers the correspondences between the antenna logical names and the access paths in relation to only the antennas whose calibration tags are successfully read, into the antenna configuration information table 11.

Further, when the control terminal T1 has a function for obtaining an R/W number list of the readers connected to the control terminal T1, and when the readers have a function for obtaining an antenna number list of the antennas connected to the readers, it may be possible to generate the access path range by using such functions (S201).

The antennas corresponding to the antenna logical names assigned to the same sequence number of the driving sequence information table 10 are simultaneously driven, so that the antennas are necessary to be connected to different readers. When two or more antenna logical names assigned to the same sequence number of the driving sequence information tale 10 are associated with the same R/W number in the antenna configuration information table 11, it is assumed to be miswired. The configuration information confirming unit 23 confirms each of the entries of the driving sequence information table 10, and if finding an entry that matches the condition, then generates one entry for the miswiring information table 12 from the found entry.

Figure 7:
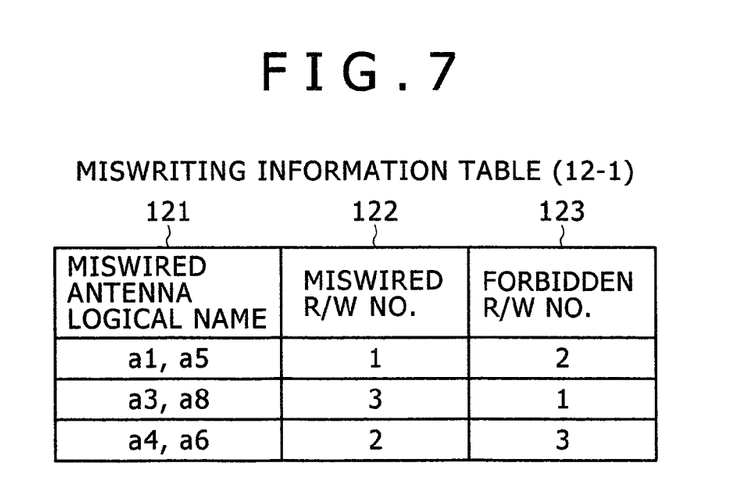
FIG. 7 is a diagram showing an example of a miswiring information table in the first embodiment.

The miswiring information table 12 contains a miswired antenna logical name 121, a miswired R/W number 122, and a forbidden R/W number 123 as shown in FIG. 7. The combination of antenna logical names in which miswiring is found is registered as the miswired antenna logical name 121. In other words, the miswired antenna logical name registered here is a combination of the antenna logical names that are assigned to the same sequence number in the driving sequence information table 10 and are associated with the same R/W number in the antenna configuration information table 11. The R/W number with which the antenna logical names registered as the miswired antenna logical name 121 are associated in the antenna configuration information table 11, is registered as the miswired R/W number 122.

The R/W number unavailable for the rewiring of the antenna logical names registered as the miswired antenna logical name 121, is registered as the forbidden R/W number 123. In other words, the forbidden R/W number registered here is the R/W number with which the antenna logical name without being registered as the miswired antenna logical name 121 is associated in the antenna configuration information table 11, of all the antenna logical names registered in the entry of the driving sequence information table 10 in which the antenna logical names registered as the miswired antenna logical name 121 are described.

As an example, a description will be given of a case in which the driving sequence information table 10 and the antenna configuration information table 11 have the contents as shown in FIGS. 3 and 6, respectively. First, the configuration information confirming unit 23 extracts a list of antenna logical names (a1, a5, a7) from the antenna logical name 102 of the first entry of the driving sequence information table 10. Next, the configuration information confirming unit 23 obtains the R/W number corresponding to each of the antenna logical names by referring to the antenna configuration information table 11. In this case, the correspondences between the obtained antenna logical names and the R/W numbers are as follows: (antenna logical names, R/W numbers)=((a1, 1), (a5, 1), (a7, 2)). Here, the antenna logical names "a1" and "a5" both correspond to the R/W number 1, so that an entry is generated for the miswiring information table 12.

The configuration information confirming unit 23 registers the antenna logical names "a1" and "a5" corresponding to the same R/W number, as the miswired antenna logical name 121 of the miswiring information table 12. Then, the configuration information confirming unit 23 registers the R/W number 1 with which these antenna logical names are associated, as the miswired R/W number 122. Of the correspondences generated as described above, (antenna logical name, R/W number)=(a7, 2) is the one in which the antenna logical name is not registered as the miswired antenna logical name 121. The configuration information confirmation unit 23 registers the R/W number 2 included in the relevant correspondence, as the forbidden R/W number 123. In this way, one entry is generated for the miswiring information table 12.

Then, the configuration information confirming unit 23 performs the same process for the second entry and subsequent entries registered in the driving sequence information table 10. The entries of the miswiring information table 12 are generated in this way. As a result, the miswiring information table 12 has the content shown in FIG. 7 (S202). The entries are registered in the miswiring information table 12 in S202, which means that miswiring exists. Thus, the process proceeds to the next step S204 (S203).

In step S204, the configuration information confirming unit 23 generates a substitution operation for resolving the miswiring registered in the first entry of the miswiring information table 12. The configuration information confirming unit 23 extracts the miswired R/W number 122 and the forbidden R/W number 123 from the first entry of the miswiring information table 12, and searches the entry in which an R/W number other than the extracted R/W numbers is registered as the miswired R/W number 122, from the miswiring information table 12. In this case, since the R/W numbers (1, 2) are extracted from the first entry of the miswiring information table 12, the second entry is searched as the entry in which the extracted R/W numbers are not registered as the miswired R/W number 122.

The miswiring of the first entry is resolved by substituting the miswired antenna logical names 121 registered in the first entry and in the second entry on a pair-by-pair basis. In this case, the antenna logical names (a1, a5) are registered as the miswired antenna logical name 121 of the first entry and the antenna logical names (a3, a8) are registered as the miswired antenna logical name 121 of the second entry. The configuration information confirming unit 23 extracts one antenna logical name as a substitution candidate from each of the entries. For example, the configuration information confirming unit 23 extracts the antenna logical name "a1" from the first entry, and the antenna logical name "a3" from the second entry. The substitution operation of the extracted antenna logical names (a1, a3) is the wiring substitution operation on the antenna side.

Next, the configuration information confirming unit 23 obtains the wiring substitution operation on the reader antenna port side. The configuration information confirming unit 23 searches the antenna configuration information table 11 for the entry in which the antenna logical names to be subjected to the substitution operation obtained as described above are registered, and extracts the access paths (R/W numbers, antenna port numbers) of the antennas corresponding to each of the antenna logical names. In this case, the access path (R/W number, antenna port number)=(1, 1) is extracted for the antenna logical name "a1", and the access path (R/W number, antenna port number)=(3, 1) is extracted for the antenna logical name "a3". The substitution operation of the pair of the extracted access paths (R/W numbers, antenna port numbers)=((1, 1), (3, 1)) is the wiring substitution operation on the reader antenna port side.

Figure 8:
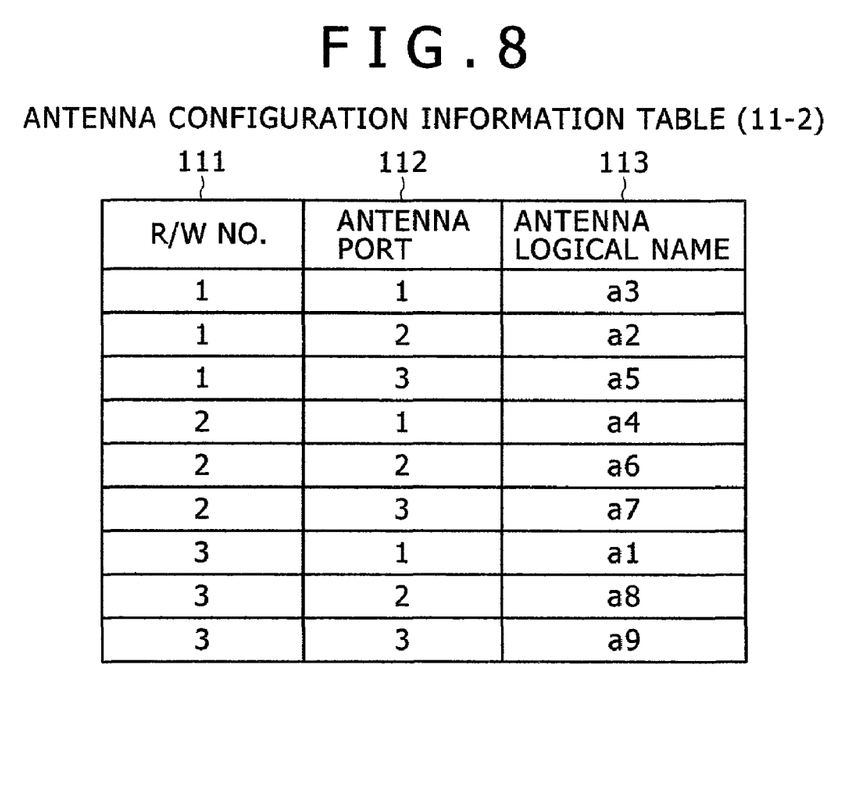
FIG. 8 is a diagram showing an example of the antenna configuration information table in the first embodiment.

Then, the configuration information confirming unit 23 substitutes the antenna logical name 113 of the antenna configuration information table 11 based on the obtained substitution operation of the antenna logical names. In this case, the configuration information confirming unit 23 substitutes the antenna logical name "a1" and the antenna logical name "a3". FIG. 8 shows the content of the antenna configuration information table after substitution (S204).

The process returns to S202. The configuration information confirming unit 23 once clears the miswiring information table. Then, the configuration information confirming unit 23 compares the driving sequence information table 10 with the antenna configuration information table 11 by the same procedure as described above, and if finding a miswiring, then adds an entry of the content of the found miswiring into the miswiring information table 12.

Figure 9:
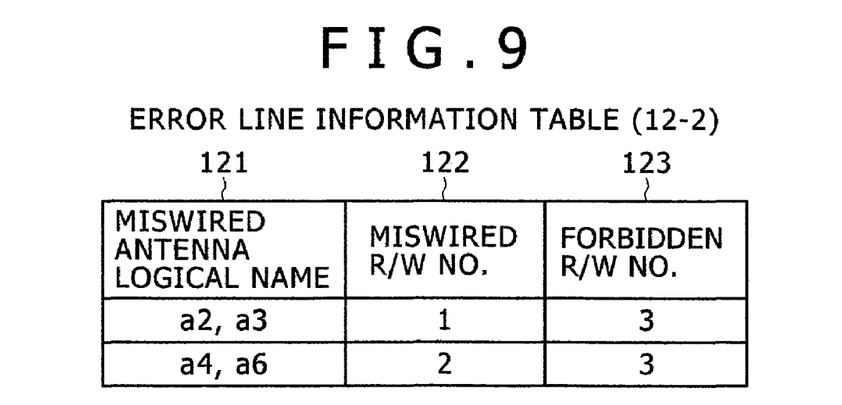
FIG. 9 is a diagram showing an example of the miswiring information table in the first embodiment.

In this case, the driving sequence information table 10 has the content shown in FIG. 3 and the antenna configuration information table 11 has the content shown in FIG. 8, so that the miswiring information table 12 shown in FIG. 9 is finally generated (S202). As the entry is registered in the miswiring information table 12 in S202, miswiring still exists. Thus, the process proceeds to the next step 204 (S203).

The configuration information confirming unit 23 generates a wiring substitution operation on the antenna side and a wiring substitution operation on the reader antenna port side, by the same procedure as described above. In this case, the miswiring information table 12 has the content shown in FIG. 9. The configuration information confirming unit 23 extracts one antenna logical name for substitution from the miswired antenna logical names (a2, a3) registered in the first entry of the miswiring information table 12, and extracts one antenna logical name from the miswired antenna logical names (a4, a6) registered in the second entry. For example, here, the configuration information confirming unit 23 extracts the antenna logical name "a2" from the first entry and the antenna logical name "a4" from the second entry. The substitution operation of the extracted antenna logical names (a2, a4) is the wiring substitution operation on the antenna side.

Next, the configuration information confirming unit 23 obtains the wiring substitution operation on the reader antenna port side. The procedure is the same as described above. The configuration information confirming unit 23 obtains the access path (R/W number, antenna port number) =(1, 2) corresponding to the antenna logical name "a2" and the access path (R/W number, antenna port number)=(2, 1) corresponding to the antenna logical name "a4", from the antenna configuration information table 11-2. The substitution operation of the obtained pair of access paths (R/W numbers, antenna port numbers)=((1, 2), (2, 1)) is the wiring substitution operation on the reader antenna port side.

Figure 10:
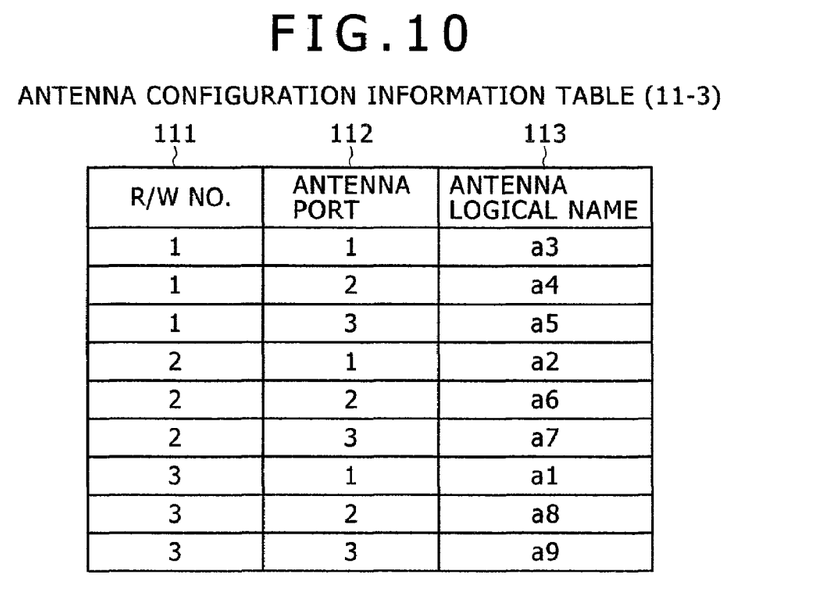
FIG. 10 is a diagram showing an example of the antenna configuration information table in the first embodiment.

Then, the configuration information confirming unit 23 substitutes the antenna logical name 113 of the antenna configuration information table 11, based on the substitution operation of the antenna logical name obtained as described above. In this case, the configuration information confirming unit 23 substitutes the antenna logical name "a2" and the antenna logical name "a4". FIG. 10 shows the content of the antenna configuration information table after substitution (S204).

The process returns to S202. The configuration information confirming unit 23 once clears the miswiring information table. Then, the configuration information confirming unit 23 compares the driving sequence information table 10 with the antenna configuration information table 11, by the same procedure as described above, and if finding miswiring, adds an entry of the content of the found miswiring into the miswiring information table 12.

In this case, the driving sequence information table 10 has the content shown in FIG. 3 and the antenna configuration information table 11 has the content shown in FIG. 10. Thus, none of the two or more antenna logical names that are assigned to the same sequence number of the driving sequence information table 10 are associated with the same R/W number in the antenna configuration information table 11. As a result, the miswiring information table 12 generated in this step is empty (S202). Because no entry is registered in the miswiring information table 12 in S202, the process proceeds to the next step S205 (S203).

When determining that the antenna logical names are substituted in the foregoing steps (S205), the process proceeds to the next step S206. The configuration information confirming unit 23 displays an antenna rewiring instruction onto a display 31. The operation content to be instructed to the user is either the wiring substitution operation on the antenna side, [(a1, a3) (a2, a4)], or the wiring substitution operation on the reader antenna port side, [(R/W numbers, antenna port numbers)= ((1,1), (3,1)) ((1, 2), (2,1)].

Figure 11:
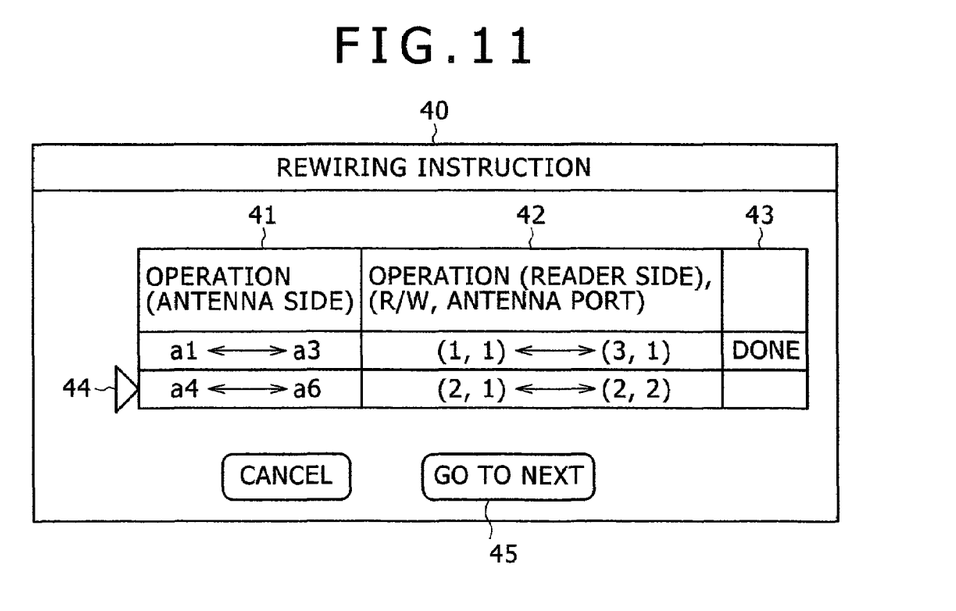
FIG. 11 is a diagram showing an example of a screen of a rewiring instruction in the first embodiment.

FIG. 11 shows an example of the rewiring instruction screen displayed to the user in the first embodiment. In the screen, a wiring substitution instruction 41 on the antenna side and a wiring substitution instruction 42 on the reader antenna port side are displayed side by side. Of the two operations, the user selects the one likely to be easy to use, and performs the wiring operation. In FIG. 11, the completed substitution operation is indicated by "Done" in a status column 43, and an indicator 44 indicates the next wiring substitution operation to be performed. Upon completion of the substitution operation of one antenna pair, the user presses "Go to Next" button 45. The status column 43 of the operation indicated by the indicator 44 is changed to "Done", then the indicator 44 moves down by one line. With this screen, the user can surely perform the operation without failing the order of the wiring operation (S206).

Incidentally, if there is no inconsistency in the initial content of the antenna configuration information table 11 in the determination of step S205, the configuration information confirming unit 23 displays a message to notify that the antenna wiring is normal, on the display 31 (S207).

As described above, in the first embodiment, the installation positions of the antennas on the shelves are as shown in FIG. 1, but the present invention is not limited the above embodiment, and the installation positions may be set arbitrarily. Further, in the embodiment, it is assumed that the number of antennas is 9 and the number of readers is 3, but the numbers of antennas and readers may be set arbitrarily. Further, in the embodiment, the user installs the calibration tags 1 onto the antennas in the building of the system, but it may also be possible that the antennas have their calibration tags 1 from the start.

When the antennas are prepared to have their own identifiers and when the readers can read the identifiers, there is no need for the user to install the calibration tags 1. In this case, in the process of generating the antenna configuration information in S201, the readers read the identifiers from all the antennas to generate the correspondences between the access paths and identifiers of the antennas. The other processes are substantially the same as those described above.

Incidentally, the inventors of the present application have filed Japanese Patent Application No. 2006-37587 (filed on Feb. 15, 2006) as an invention using calibration RFID tags, in relation to the RFID antenna connection technology. This invention has been developed to provide a technology that allows plural RFID antennas to be simultaneously driven without interference occurring, by attaching calibration RFID tags to the RFID antennas, obtaining a combination of the RFID antennas that could cause a problem when simultaneously used, based on whether the information held by the calibration RFID tags can be read from the RFID antennas subjected to simultaneous reading, generating a use procedure of the RFID antennas not to be used simultaneously in the combination, and operating each of the RFID antennas according to the procedure.

What is claimed is:

1. A method for supporting an antenna wiring of an RFID system having a plurality of antennas, a plurality of readers for driving the antennas, and a control terminal for controlling the readers, the method comprising the steps of:

in normal operation of the RFID, controlling, by the control terminal, the antennas based on driving sequence information indicating combinations of antenna logical names of the one or more antennas to be simultaneously driven, and on antenna configuration information indicating correspondences between the antenna logical names and access paths, in building of the RFID system, installing calibration tags on which the antenna logical names are written onto the antennas, and driving, by the control terminal, the plurality of readers, to generate the antenna configuration information by reading the calibration tags from the plurality of antennas, compare the driving sequence information with the antenna configuration information, and perform a rewiring instruction of the antennas if there is an inconsistency in the setting.

2. The method for supporting the antenna wiring according to claim 1, wherein the access path includes an R/W number for identifying the reader, and when the two or more antenna logical names having a simultaneous setting in the derive sequence information are associated with the same R/W number in the antenna configuration information, it is assumed that there is an inconsistency in the setting.

3. The method for supporting the antenna wiring according to claim 1, wherein the method comprises generating a substitution operation of the antenna logical names so that the inconsistency is resolved by substituting the antenna logical names described in the antenna configuration information, and generating a rewiring instruction of the wires connected to the antennas from the generated substitution operation.

4. The method for supporting the antenna wiring according to claim 1, wherein the method comprises generating a substitution operation of the access paths so that the inconsistency is resolved by substituting the access paths described in the antenna configuration information, and generating a substitution instruction of the wires connected to the readers from the generated substitution operation.

5. A system for supporting an antenna wiring of an RFID system, comprising:

a plurality of antennas;

a plurality of readers for driving the antennas; and a control terminal for controlling the readers, wherein the control terminal includes:

in operation of the RFID system, a reader controller for controlling the antennas based on driving sequence information indicating combinations of antenna logical names of the one or more antennas to be simultaneously driven and on antenna configuration information indicating correspondences between the antenna logical names and access paths;

in building of the RFID system, a configuration information generating unit for generating the antenna configuration information by driving the plurality of readers, and by reading calibration tags on which the antenna logical names are written from the plurality of antennas and which are installed on the antennas; and a configuration information confirming unit for comparing the driving sequence information with the generated antenna configuration information, and performing a rewiring instruction of the antennas if there is an inconsistency in the setting.

6. The system for supporting the antenna wiring according to claim 5, wherein the access path of the antenna configuration information includes an R/W number for identifying the reader, and when the two or more antenna logical names having a simultaneous setting in the driving sequence information are associated with the same R/W number in the antenna configuration information, the configuration information confirming unit assumes that there is an inconsistency in the setting.

7. The system for supporting the antenna wiring according to claim 5, wherein the configuration information confirming unit generates a substitution operation of the antenna logical names so that the inconsistency is resolved by substituting the antenna logical names described in the antenna configuration information, and generates a rewiring instruction of the wires connected to the antennas from the generated substitution operation.

8. The system for supporting the antenna wiring according to claim 5, wherein the configuration information confirming unit generates a substitution operation of the access paths so that the inconsistency is resolved by substituting the access paths described in the antenna configuration information, and generates a substitution instruction of the wires connected to the readers from the generated substitution operation.

* * * * *